United States Patent [19]

Wittmann et al.

[11] Patent Number: 4,822,852

[45] Date of Patent: Apr. 18, 1989

[54] HIGH-IMPACT DIMENSIONALLY STABLE POLYAMIDE MOLDING COMPOSITIONS

[75] Inventors: Dieter Wittmann, Krefeld; Uwe Westeppe, Remscheid; Karsten-Josef Idel, Krefeld; Christian Lindner, Cologne; Josef Merten, Korschenbroich; Harald Selbeck, Krefeld, all of Fed. Rep. of Germany

[73] Assignee: Bayer Akteingesellschaft, Leverkusen, Fed. Rep. of Germany

[21] Appl. No.: 112,532

[22] Filed: Oct. 26, 1987

[30] Foreign Application Priority Data

Nov. 5, 1986 [DE] Fed. Rep. of Germany ....... 3637677

[51] Int. Cl.$^4$ .............................................. C08L 51/00
[52] U.S. Cl. ..................................... 525/66; 525/431; 525/432; 525/474
[58] Field of Search ................. 525/66, 431, 432, 474; 528/26

[56] References Cited

U.S. PATENT DOCUMENTS

| | | |
|---|---|---|
| 4,321,336 | 3/1982 | Meyer et al. ......................... 525/431 |
| 4,338,406 | 7/1982 | Sanderson et al. ................... 525/66 |
| 4,338,409 | 7/1982 | Grigo et al. .......................... 525/66 |
| 4,404,317 | 9/1983 | Epstein et al. ....................... 525/432 |
| 4,405,748 | 9/1983 | Nielinger et al. .................... 525/66 |
| 4,410,661 | 10/1983 | Epstein et al. ....................... 525/66 |
| 4,423,186 | 12/1983 | Grigo et al. .......................... 525/66 |
| 4,581,408 | 4/1986 | Trabert et al. ....................... 525/66 |

FOREIGN PATENT DOCUMENTS 2906222 8/1980 Fed. Rep. of Germany ........ 525/66
2169912 7/1986 United Kingdom ............... 525/431

OTHER PUBLICATIONS

"Chemie und Technologie der Silicone", Verlag Chemie GMBV, Weinheim/Bergstr. (1968), pp. 107-111 and 149-160.

Primary Examiner—Lewis T. Jacobs
Assistant Examiner—Ralph H. Dean, Jr.
Attorney, Agent, or Firm—Connolly & Hutz

[57] ABSTRACT

The invention relates to thermoplastic molding compositions showing improved properties, more especially improved dimensional stability and notched impact strength, particularly at low temperatures, in the form of a mixture of at least 35% by weight of a copolyamide containing polydiorganosiloxane carbonamide units and/or of a mixture of partly crystalline polyamides and (co)polyamides containing polydiorganosiloxane carbonamide units and from 1 to 65% by weight of graft products of vinyl polymers on rubbers.

The invention also relates to the dimensionally stable molding compositions tough at low temperatures characterized above which additionally contain amorphous siloxane-free polyamides added in quantities of up to 64% by weight.

20 Claims, No Drawings

HIGH-IMPACT DIMENSIONALLY STABLE POLYAMIDE MOLDING COMPOSITIONS

This invention relates to thermoplastic molding compositions showing improved properties, more especially improved dimensional stability and notched impact strength, particularly at low temperatures, in the form of a mixture of at least 35% by weight of a copolyamide containing polydiorganosiloxane carbonamide units and/or of a mixture of partly crystalline polyamides and (co)polyamides containing polydiorganosiloxane carbonamide units and from 1 to 65% by weight of graft products of vinyl polymers on rubbers.

The present invention also relates to the dimensionally stable molding compositions tough at low temperatures characterized above which additionally contain amorphous siloxane-free polyamides added in quantities of up to 64% by weight.

High-impact thermoplastic polyamide molding compositions containing graft products are known. Thus, according to DE-A No. 2 435 266, molding compositions of this type contain graft products of vinyl monomers and (meth)acrylic acid on rubbers. According to JA No. 2 354/71, styrene/acrylonitrile (SAN) graft polymers may also be used. DE-A No. 3 105 364 claims mixtures containing graft products of (meth)acrylic acid esters on rubbers. U.S. Pat. No. 4,167,505 emphasizes the suitability of graft polymers of which the graft branches consist of alkyl acrylate.

All these known molding compositions are thermoplasts characterized by improved toughness. However, optimal notched impact strength is often only obtained with high contents of graft product, so that not only is thermoplastic processibility impaired, the rigidity of the molding compositions is also reduced. Together with dimensional changes brought about by the uptake of water, coupled with losses of rigidity, the disadvantages mentioned above make conventional polyamide molding compositions difficult to use in certain fields, for example in car body parts.

The addition of silicone oils to thermoplasts, including polyamides, to improve their processibility is also known, cf. for example European Plastic News, July/August 1976, pages 32/33 and EP-A No. 583. However, an addition such as this is attended by certain disadvantages, including the ready extractability of the oils and, in particular, the poor affinity of the molding compositions for painting.

U.S. Pat. No. 4,346,200 emphasizes the improved tensile strength and notched impact strength of molding compositions of polyamides and elastomeric block copolyamides, of which the elastomer segments are also referred to as poly-($C_1$–$C_4$-dialkylene)-siloxanes.

According to EP-A No. 0 054 426 and DE-A No. 2 120 961, the surface properties and processibility of polyamides may be favorably influenced through the incorporation of siloxane sequences.

However, the toughness level of molding compositions of polysiloxane-polyamide block copolymers either on their own or in admixture with polyamides or even of polyamides containing silicone oils is inadequate for the above-mentioned applications as car body parts exposed to weathering.

Accordingly, the object of the present invention is to provide readily processible, dimensionally stable polyamide molding compositions, more especially with reduced levels of graft product and greater rigidity, showing improved low-temperature notched impact strength compared with conventional molding compositions, which they largely retain even in their conditioned state.

It has now surprisingly been found that the notched impact strength, particularly at low temperatures, and the rigidity/dimensional stability of mixtures of partly crystalline polyamides and graft products may be considerably improved when the polyamide component contains polydiorganosiloxane carbonamide units.

This surprisingly synergistic effect produced by the polydiorganosiloxane carbonamide component is fully developed or actually enhanced even when the molding compositions additionally contain amorphous polyamide. Compared with the siloxane-free products described in EP-A No. 0 073 036, the molding compositions thus obtained show considerably improved notched impact strengths, particularly at low temperatures.

Accordingly, the present invention relates to thermoplastic molding compositions in the form of a mixture of (A) at least 35% by weight, preferably from 50 to 96% by weight and more preferably from 65 to 95% by weight
  1. of a partly crystalline thermoplastic (co)polyamide containing polydiorganodiloxane carbonamide units and/or
  2. of a mixture of
    (a) partly crystalline, thermoplastic polyamides and
    (b) a partly crystalline or amorphous polyamide or copolyamide containing polydiorganosiloxane carbonamide units, (A) containing in all from 0.1 to 40% by weight, preferably from 0.5 to 25% by weight and more preferably from 1 to 10% by weight of polydiorganosiloxane carbonamide units, (B) from 1 to 65% by weight, preferably from 2 to 50% by weight and more preferably from 5 to 35% by weight of a graft product of vinyl monomers on a rubber base and (C) from 0 to 64% by weight, preferably from 2 to 64% by weight and more preferably at least 3% by weight, for example from 10 to 30% by weight, of an amorphous polyamide.

According to the invention, therefore, the values of (A) to (C) should be selected so that they add up to 100%.

The polyamides (A) containing polydiorganosiloxane carbonamide units may be prepared by partly replacing the dicarboxylic acid(s)/derivative(s) and/or the diamine or the lactam or the aminocarboxylic acid in processes known per se for the production of polyamides, for example melt condensation or interfacial condensation of dicarboxylic acids or derivatives thereof and diamines or of aminocarboxylic acids and lactams, by corresponding amino- or carboxyl-terminated, so-called organofunctional polydiorganosiloxane compounds.

Where polyamides produced from lactams by known methods are used, the polymerization is carried out in the presence of an amino-terminated polydiorganosiloxane (and optionally an equimolar quantity of a dicarboxylic acid) or, conversely, in the presence of a carboxyl (derivative)-terminated polydiorganosiloxane (and optionally an equimolar quantity of a diamine).

The above-mentioned polydiorganosiloxanes containing suitable terminal groups are preferably difunctional products, although the presence of small quantities of monofunctional and/or trifunctional products is acceptable.

The polyamide component is characterized in that it contains polydiorganosiloxane carbonamide units corresponding to the following general formula

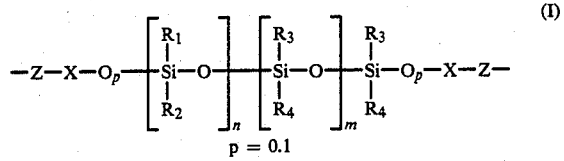

(I)

in which $R_1$, $R_2$, $R_3$ and $R_4$ independently represent $C_1$-$C_{12}$ alkyl, alkenyl, aryl, aralkyl, halogenated alkyl, aryl or aralkyl; preferred radicals R are methyl, phenyl and vinyl, methyl being particularly preferred;

X represents $C_1$-$C_{18}$ alkylene, arylene or aralkylene radicals, preferably $C_2$-$C_6$ alkylene radicals and, more preferably, isopropylene radicals;

Z represents

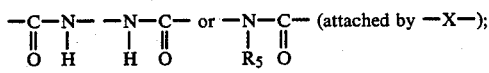

$R_5$ represents alkyl, preferably $C_1$-$C_6$ alkyl, or $C_5$-$C_8$ cycloalkyl, preferably cyclohexyl, and n and m may be the same or different, the sum of n +m being greater than 4 and less than 1000, preferably greater than 10 and less than 600 and more preferably greater than 20 and less than 300.

The production of polydiorganosiloxane polyamides containing a silicon-carbon bond (p = 0) is known and is described, for example, in EP-A No. 54 426, DE-A No. 2 120 961, DE-A No. 2 121 787 and U.S. Pat. No. 3,392,143; polyamides in which p = 1 are new and are claimed in an application which Applicants filed at the same time as the present application under the number P 3 637 676.0 (Le A 24 820).

Organofunctional polysiloxanes containing amino groups which correspond to the following formula (with —Si—O—X—bonds; i.e. p = 1)

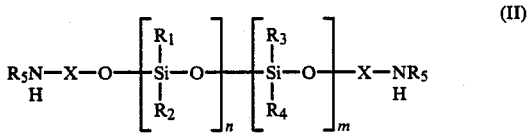

(II)

are known compounds and may be obtained, for example, by reaction of a polysiloxane corresponding to the following formula

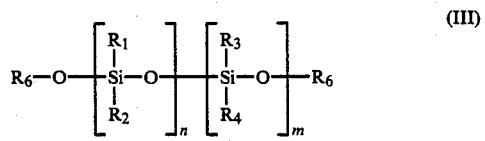

(III)

with equimolar quantities of a hydroxyamino compound HO—X—$NHR_5$, optionally in the presence of a catalyst (cf. for example E. Larsson, Acta Chimica Scandinavica 8, 898 (1954)).

In formulae II and III above, $R_1$ to $R_4$, X, m and n are as defined above;

$R_5$ represents H or alkyl, preferably $C_1$-$C_6$ alkyl or $C_5$-$C_8$ cycloalkyl, (preferably cyclohexyl); more particularly, $R_5$ represents H or cyclohexyl;

$R_6$ represents $C_1$-$C_6$ alkyl or aryl, preferably methyl.

To prepare the (co)polyamides containing polydiorganosiloxane carbonamide units, the amino-terminated polydiorganosiloxane compounds are condensed in the presence of substantially equimolar quantities of a dicarboxylic acid (and in the production of copolyamides) with salts of dicarboxylic acids and diamines, aminocarboxylic acids or lactams to form polysiloxane-containing polyamides. Surprisingly, the Si—O—X—bond is sufficiently stable to hydrolysis for this system, although silicone derivatives of the type in question would normally be regarded as not really suitable or as totally unsuitable on account of their ready hydrolyzability.

Suitable dicarboxylic acids and diamines are those of the type normally used for the production of polyamides, such as $C_2$-$C_{10}$ α,ω-dicarboxylic acids, phthalic acid, terephthalic acid, isophthalic acid, cyclohexane dicarboxylic acid, $C_2$-$C_{10}$ α,ω-diamines, m- or p-xylylenediamine, 2,2,4- and/or 2,4,4-trimethyl-hexamethylene diamine, isophorone diamine or other dicarboxylic acids or diamines typically used for the production of polyamides.

Alternatively, the terminated polydiorganosiloxane, in which the reactive groups are attached to organic radicals ("organofunctional"), is advantageously condensed with a $C_6$-$C_{12}$ lactam in the presence of equimolar quantities of dicarboxylic acids or diamines (depending on the type of terminal groups in the siloxane compound). The polyamides containing siloxane groups may also be produced by solution condensation or, in the case of lactams, even by anionic polymerization in the presence of standard catalysts.

For the preparation of polydiorganosiloxane-containing (co)polyamides, particularly those having high contents (>10% by weight and preferably ≧15% by weight) of siloxane segments, the production process may be carried out with advantage in the presence of small quantities, for example from 0.1 to 20% by weight, preferably ≦10% by weight and, more preferably, ≦5% by weight, for example 0.5 to 5% by weight, based on the (co)polyamide, of a polyether diamine containing at least 2 oxyalkylene groups and 2 (cyclo)aliphatically bound amino groups and having a molecular weight of ≧148 and more especially ≧400. Suitable polyether diamines are, for example, 1,11-diamino-3,6,9-trioxaundecane, 1,8-diamino-3,6-dioxaoctane, but more especially polyoxyalkylene polyether diamines such as oxyethylene, oxypropylene or oxytetramethylene polyether diamines having molecular weights of preferably from 400 to 3500.

These polyoxyalkylene ether diamines may be prepared, for example, by amination of polyoxyalkylene etherdiols under pressure, by addition of acrylonitrile to polyetherdiols and subsequent reduction of the nitrile group, by alkali-catalyzed hydrolysis of NCO prepolymers of polyetherdiols and (cyclo)aliphatic diisocyanates or by other known methods. Examples of polyether diamines eminently suitable for use in accordance with the invention are the commercially available Jeffamines ®.

The addition of polyether diamines is effective in the production of polyamides both from lactams (for example nylon 6) and in particular from salts of dicarboxylic acids and diamines, for example nylon 66; 6,10 or others, and may be used with particular effect in the production of amorphous (co)polyamides containing polydiorganosiloxane carbonamide units (for example based on isophthalic acid and hexamethylenediamine and, optionally, ternary cocomponents).

The additional incorporation of the polyether diamine by condensation gives (co)polyamide molding compositions in which there is excellent compatability between the polysiloxane and polyamide units and in which the polydiorganosiloxane-extractable component is distinctly smaller than it is without the polyether diamine, even where good solvents are used for the polydiorganosiloxanes.

The polydiorganosiloxane units may be attached either to one another and/or to the polyamide-forming components (including the polyether diamines) through the carbonamide groups. The use of the organofunctional polydiorganosiloxane components is characterized in that, after the incorporation reaction, only a very small proportion can be extracted from the polyamide with a good solvent for the starting siloxane.

Suitable polyamide components (A.2a) of the molding compositions according to the invention are any partly crystalline polyamides, more especially polyamide-6, polyamide-6,6, and partly crystalline copolyamides based on these two components. Also suitable are partly crystalline polyamides of which the acid component consists in particular completely or partly (in addition to adipic acid or caprolactam) of terephthalic acid and/or isophthalic acid and/or suberic acid and/or sebacic acid and/or azelaic acid and/or adipic acid and/or a cyclohexanedicarboxylic acid and of which the diamine component consists completely or partly of, in particular, m- and/or p-xylylenediamine and/or hexamethylenediamine and/or 2,2,4- and/or 2,4,4-trimethylhexamethylenediamine and/or isophoronediamine and of which the compositions are known from the prior art.

Partly crystalline polyamides prepared completely or partly from $C_6$-$C_{12}$ lactams, optionally used in one or more of the starting components mentioned above, are also suitable.

Particularly preferred partly crystalline polyamides (A.2a) are polyamide-6 and polyamide-6,6 or copolyamides containing only small proportions (up to about 10% by weight) of the co-components.

The polyamide-forming components mentioned may also be used for the production of the copolyamides (A.1) or (A.2b) containing polydiorganosiloxane units using, as already mentioned, amino- and/or carboxylorganofunctional, substantially linear polydiorganosiloxanes (preferably siloxane compounds based on polydimethylsiloxanes).

The following compounds for example may be used as organofunctional, substantially linear polydiorganosiloxane compounds:

The compounds contain, on the one hand, recurring structural units of the formula —O—Si(R)$_2$—, in which R is a $C_1$-$C_4$ alkyl radical or a phenyl radical, but preferably a methyl radical. The terminal functional amino or carboxyl groups are organofunctional, i.e. are not directly attached to silicon, but instead are attached to the siloxane group through carbon-containing radicals. The carbofunctional terminal groups are preferably aliphatic or cycloaliphatic $C_1$-$C_6$ hydrocarbon radicals (optionally containing heteroatoms, such as in particular oxygen) which contain at least one primary or even secondary amino group. or (less preferably) a carboxyl group. Diorganofunctional (carbofunctional) radicals may be present, for example, in the form of the following radicals (attached through —O— to Si or directly to Si, preferably through —O— to Si atoms): —CH$_2$—NH$_2$, —CH$_2$—CH$_2$—NH$_2$, —(CH$_2$)$_4$—NH$_2$, —CH$_2$—NH—C$_4$H$_9$ or CH$_2$NH—C$_6$H$_{11}$. In the polysiloxanes to be incorporated, polyoxyalkylene, more especially polyoxyethylene and/or polyoxypropylene units may be present in the chain in addition to the —O—Si(R)$_2$ units mentioned (functional polyethersiloxanes).

Partly crystalline, thermoplastic polyamides A containing the polydiorganosiloxane carbonamide units may be directly synthesized in such a way that the quantity of these units required for component (A) is also incorporated (copolyamides of type (A.1).

However, it is preferred to synthesize polyamides or copolyamides containing polydiorganosiloxane carbonamide units (A.2b), in which these siloxane units are present either exclusively or (preferably) in a higher proportion (for example ≦90% by weight and more especially ≦65% by weight) than necessary for component A, and then to mix them in suitable quantities with (siloxane-free) partly crystalline thermoplastic polyamides (A.2a) in corresponding quantities.

An upper limit to the content of polydiorganosiloxane carbonamide units is imposed largely by excessive loss of rigidity (possibly with transition to elastomeric properties), which precludes the use of the polyamide molding compositions for the intended applications.

The polyamides of component (A) should preferably have a relative viscosity (as measured on a 1% by weight solution in m-cresol at 25° C.) of from 2.0 to 5.0 and more preferably from 2.5 to 4.0.

From 65 to 85% by weight and more especially from 75 to 85% by weight of the graft products B according to the invention consist of a crosslinked, particulate elastomeric graft base having an average particle diameter ($d_{50}$) of from 0.25 to 0.8 μm and more especially from 0.3 to 0.6 μm, a gel content of at least 70% by weight and a glass transition temperature of < −20° C. and 35 to 15% by weight and more especially 25 to 15% by weight of a graft overlay of vinyl monomer polymer of which more than 40% by weight is grafted onto the elastomeric rubber graft base.

The elastomer components present in the graft products (B) according to the invention are elastomers having glass transition temperatures below −20° C., such as elastomers selected from diene rubbers (more especially polybutadiene, polychloroprene, polyisoprene), olefin rubbers or acrylate rubbers (more especially homopolymers or copolymers of alkyl acrylates containing up to 12 carbon atoms in the ester group which may be copolymerized for possible crosslinking with polyfunctional unsaturated monomers). Preferred rubber components are polybutadienes and copolymers thereof with styrene, acrylonitrile or alkyl acrylates and also acrylate rubbers. The elastomer components generally have a particulate, crosslinked structure with average particle diameters of from 0.25 to 0.8 μm (more especially 0.3 to 0.6 μm; $d_{50}$-values) and have gel contents of at least 70% by weight and preferably of at least 80% by weight.

Particularly suitable rubbers are polybutadienes or copolymers thereof and also alkyl acrylate rubbers. Alkyl acrylate rubbers are particularly advantageous when they have a so-called core-shell structure, i.e. they contain a core of polymer other than to acrylate rubber. This core is surrounded by a shell of crosslinked alkyl acrylate rubber which is then grafted with vinyl monomer polymer. Rubbers such as these are known. More than 40% by weight and, in particular, more than 50% by weight of the vinyl monomer polymer is grafted onto the elastomer component. This may be verified by known methods, for example by measuring the graft yield.

The vinyl monomer polymer consists of one or more monomers selected with (meth)acrylic acid ($C_1$-$C_{18}$) esters. At least 76% of preferred graft overlays consist of methyl methacrylate and up to 24% of other (meth)acrylates, such as n-butylacrylate and t-butylacrylate, which may also be present in the form of mixtures.

The graft product B is produced by graft polymerization in the presence of an aqueous dispersion of the elastomer. The polymerization is initiated, for example, by radical initiators, for example with persulfates, peroxides, percarbonates, peresters, but especially by water-insoluble initiators, such as persulfates or redox initiator systems. Polymerization reactions or polymers such as these are known.

Other suitable graft polymers according to the invention are graft polymers produced by a two-stage process in which
rubber is grafted in emulsion with vinyl monomers and then graft-polymerized with vinyl polymers in completely broken emulsion (shell), cf EP-A No. 17 60 12).

Other suitable graft polymers are described in EP-A No. 1 88 699.

Suitable amorphous polyamides (C) are the products known from the prior art. They are obtained by polycondensation of diamines, such as ethylene diamine, hexamethylene diamine, decamethylene diamine, 2,2,4- and/or 2,4,4-trimethylhexamethylenediamine, m- and/or p-xylylenediamine, bis-(4-aminocyclohexyl)methane, 2,2,-bis-(4-aminocyclohexyl)-propane, 3,3'-dimethyl-4,4'-diaminocylohexylmethane, 3-aminomethyl-3,5,5-trimethylcyclohexylamine, 2,5- and/or 2,6-bis-(aminomethyl)-norbornane and/or 1,4-diaminomethylcyclohexane, with dicarboxylic acids, such as oxalic acid, adipic acid, azelaic acid, decane dicarboxylic acid, heptadecane dicarboxylic acid, 2,2,4- and/or 2,4,4-trimethyl adipic acid, isophthalic acid or small quantities of terephthalic acid. Amorphous copolymers obtained by polycondensation of several monomers are of course also suitable, as are copolymers prepared with addition of aminocarboxylic acids, such as ε-aminocaproic acid, ω-aminoundecanoic acid or ω-aminolauric acid or their lactams.

Particularly suitable amorphous polyamides are the polyamides prepared from isophthalic acid, hexamethylenediamine and other diamines, such as 4,4'-diaminodicyclohexylmethane, isophoronediamine, 2,2,4- and/or 2,4,4-trimethylhexamethylenediamine, 2,5- and/or 2,6-bis-(aminomethyl)-norbornane; or from isophthalic acid, 4,4'-diaminodicyclohexylmethane and ε-caprolactam; or from isophthalic acid, 3,3'-dimethyl-4,4'-diaminodicyclohexylmethane and lauric lactam; or from terephthalic acid and the isomer mixture of 2,2,4- and/or 2,4,4-trimethylhexamethylenediamine.

Instead of using pure 4,4'-diaminodicyclohexylmethane, it is also possible to use mixtures of the isomeric diaminodicyclohexylmethanes consisting of
from 70 to 99 mole % of the 4,4'-diamino isomer
from 1 to 30 mole % of the 2,4'-diamino isomer
from 0 to 2 mole % of the 2,2'-diamino isomer and, optionally, diamines condensed to a correspondingly higher degree which are obtained by hydrogenation of technical diaminodiphenylmethane. Up to 30% of the isophthalic acid may be replaced by terephthalic acid.

The amorphous polyamides should preferably have a relative viscosity (as measured on a 1% by weight solution in m-cresol at 25° C.) of from 2.0 to 5.0 and preferably from 2.5 to 4.0.

The polyamide molding compositions according to the invention may contain standard additives, such as lubricants and mold release agents, nucleating agents, stabilizers, fillers and reinforcing materials, flameproofing agents and dyes.

The molding compositions may be produced in standard mixing units, such as rolls, kneaders, single-screw and multi-screw extruders.

Although, in most cases, all the components are best mixed in one step, it may sometimes be advisable initially to leave out one or even two components and to add them at a later stage.

Thus, the molding compositions according to the invention may be produced using the mixing units mentioned above by melting components (A), (B) and, optionally, (C) together and homogenizing the resulting melt or by incorporating the graft polymer (B) in a melt of polyamide (A) or of a mixture of (A) and (C).

The temperature at which the mixtures are prepared should be at least 10° C. and best at most 80° C. above the melting point of the relatively high melting polyamide.

In accordance with their property spectrum, the molding compositions according to the invention may be used anywhere in the injection molding and extrusion field where the described properties are required, for example in the automotive field for fenders, bodywork parts, etc.

EXAMPLES

A. Components used
I Polyamide-6, relative viscosity 3.0 (as measured on a 1% by weight solution in m-cresol at 25° C.).

II Polyamide-6, relative viscosity 3.5 (measured as for I).

III Polyamide-6,6, relative viscosity 3.0 (measured as for I).

IV Polyamides containing polydiorganosiloxane carbonamide units (SiPA)

General procedure for the production of SiPA with different number-average molecular weights ($P_n$):
Amino-terminated polysiloxanes:

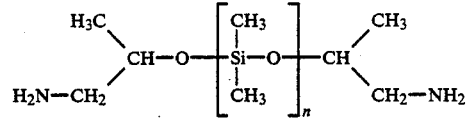

n = 40, 99, 213, 482 were prepared from octamethylcyclotetrasiloxane, isopropanolamine +KOH.

102.4 g caprolactam, 13.05 g ε-aminocaproic acid and 12.5 g (10% by weight) amino-terminated siloxanes are heated under nitrogen with equimolar quantities of adipic acid (to aminosiloxane) in a condensation apparatus for 1 h at 220° C. and for 6 h at 270° C. The polyamide molding composition is size-reduced, extracted with water and dried.

| Siloxane n = | 40 | 99 | 213 | 382 |
|---|---|---|---|---|
| H$_2$O extract (%) | 11.6 | 11.3 | 10.5 | 11.2 |
| $\eta_{rel}$* | 2.77 | 3.19 | 3.06 | 3.38 |

IV/1. n = 40
IV/2. n = 99
IV/3. n = 213
IV/4. n = 482

Determination of $P_n$: by 1H-NMR of the siloxane (proton nuclear magnetic resonance measurement).

V. Graft products (a) Elastomer graft base

Polybutadiene latex prepared by aqueous emulsion polymerization: polymer solids content 50% by weight, average particle diameter (D$_{50}$) 0.4 μm, gel content 89% by weight.

(b) Production of the graft products used

Latices of the elastomer graft base V a are introduced into a reactor so that 1184 parts by weight rubber are used. The latices are then further diluted with water to a polymer solids content of 36.2% by weight. The polymerization is initiated at 65 to 70° C. by addition of a solution of 3.5 parts by weight potassium peroxodisulfate in 100 parts by weight water. The followng product streams are then uniformly introduced into the reactor with stirring over a period of 4 hours at 65 to 70° C.:

(1) 300 parts by weight monomer mixture
  (a) methyl methacrylate 100% (V/1)
  (b) methyl methacrylate 90% by weight, n-butylacrylate 10% by weight (V/2)

(2) 410 parts by weight water
  29 parts by weight Na salt of disproportionated abietic acid
  22 parts by weight in sodium hydroxide On completion of the addition, polymerization is continued at 65° C. After stabilization with 1.6% by weight phenolic antioxidants, the latex is worked up by coagulation with a mixture of acetic acid and MgSO$_4$ at temperatures of from 70 to 98° C. After washing and drying, the graft products are worked up to form a dry powder. The quantities of polymer grafted onto the rubber are 60% by weight in the case of V/2 and 56% by weight in the case of V/1 (graft yield).

VI Amorphous polyamide of isophthalic acid and hexamethylenediamine, relative viscosity 2.6 (measured as for I), produced in the usual way.

(B) Production and testing of the polyamide molding compositions

EXAMPLES 1 to 14

The polyamide components were melted in a continuous twin-screw extruder and the graft polymer was introduced into the resulting melt and homogenized therein. The cylinder temperatures were selected so that the melt temperatures indicated in Tables 1 to 3 were maintained. The melt strand was degassed before leaving the nozzle, cooled in water, granulated and dried.

ASTM test bars were prepared from the molding compositions in a standard injection-molding machine. They were tested for Izod notched impact strength at various temperatures and the brittle-to-tough transition determined therefrom.

TABLE 1

Compositions and properties of the molding compositions

| Example | Polyamide[1] Type | Polyamide[1] % by weight | Siloxane carbonamide component Type | Siloxane carbonamide component % by weight | Graft product Type | Graft product % by weight | Brittle-to-tough transition (°C.) |
|---|---|---|---|---|---|---|---|
| 1 (Comparison) | I | 70 | — | — | V 1 | 30 | −30 |
| 2 | I | 50 | IV 2 | 20 | V 1 | 30 | −40 |
| 3 (comparison) | II | 80 | — | — | V 1 | 20 | −10 |
| 4 | II | 60 | IV 2 | 20 | V 1 | 20 | −35 |

[1]The melt temperatures in the extruder and in the injection molding machine were 270° C. (Type I) and 280° C. (Type II)

TABLE 2

Compositions and properties of the molding compositions

| Example | Polyamide[1] Type | Polyamide[1] % by weight | Siloxane carbonamide component Type | Siloxane carbonamide component % by weight | Graft product Type | Graft product % by weight | Brittle-to-tough transition (°C.) |
|---|---|---|---|---|---|---|---|
| 5 (Comparison) | II | 80 | — | — | V 2 | 20 | −15 |
| 6 | II | 60 | IV 1 | 20 | V 2 | 20 | −25 |
| 7 | II | 60 | IV 3 | 20 | V 2 | 20 | −35 |
| 8 | II | 60 | IV 4 | 20 | V 2 | 20 | −30 |

[1]The melt temperatures in the extruder and in the injection molding machine were 280° C.

TABLE 3

Composition and properties of the molding compositions

| Example Claim identification | Polyamide[1] Type | Polyamide[1] % by weight (A2a) | Siloxane carbonamide component Type | Siloxane carbonamide component % by weight (A2b) | Graft rubber Type | Graft rubber % by weight B | Amorphous polyamide Type | Amorphous polyamide % by weight C | Brittle-to-tough transition (°C.) | Water uptake (%) after 58 h |
|---|---|---|---|---|---|---|---|---|---|---|
| 9 (Comparison) | III | 70 | — | — | V/1 | 30 | — | — | 0 | 4.93 |
| 10 | III | 60 | IV/3 | 10 | V/1 | 30 | — | — | −20 | 4.92 |

TABLE 3-continued

| | Polyamide[1] | | Siloxane carbonamide component | | Graft rubber | | Amorphous polyamide | | Brittle-to-tough transition (°C.) | Water uptake (%) after 58 h |
|---|---|---|---|---|---|---|---|---|---|---|
| Example Claim identification | Type | % by weight (A2a) | Type | % by weight (A2b) | Type | % by weight B | Type | % by weight C | | |
| 11 | III | 55 | IV/3 | 10 | V/1 | 30 | VI | 5 | −25 | 4.92 |
| 12 | III | 50 | IV/3 | 10 | V/1 | 30 | VI | 10 | −30 | 4.83 |
| 13 | III | 40 | IV/3 | 10 | V/1 | 30 | VI | 20 | −35 | 4.53 |
| 14 | III | 20 | IV/3 | 10 | V/1 | 30 | VI | 40 | −40 | 4.12 |

[1]The melt temperatures in the extruder and in the injection molding machine were 280° C.
[2]Increase in weight through storage in water (60° C., 58 h, determined on 10 ASTM bars)

We claim:

1. A thermoplastic molding composition which comprises:
   (A) at least 35%, by weight of
   (1) partially crystalline thermoplastic (co)polyamide containing from 0.1 to 40%, by weight, of polydiorganosiloxane carbonamide units,
   (2) (a) a mixture of partially crystalline thermoplastic polyamide and;
   (b) an amorphous or a partially crystalline (co)polyamide containing polydiorganosiloxane carbonamide units, other than (a); wherein the mixture of (a) and (b) contains from .1 to 40%, by weight of polydiorganosiloxane carbonamide units, or (3) a mixture of (1) and (2),
   (B) from 1 to 65%, by weight, of a graft copolymer obtained by grafting one or more vinyl monomers onto an elastomeric graft base having a glass transition temperature below −20° C., a particulate, cross-linked structure with an average particle diameter of from 0.25-0.8 μm and a gel content of at least 70%, by weight, selected from diene rubber, olefin rubber or acrylate rubber; and
   (C) from 0 to 64%, by weight, of an amorphous polyamide, with the proviso that the total of A, B and C must equal 100%, by weight.

2. A composition as claimed in claim 1 comprising: from 50 to 96%, by weight, of (A), where (A) contains from 0.5 to 25%, by weight, of polydiorganosiloxane carbonamide units, from 2 to 50%, by weight, of (B); and from 2 to 64%, by weight, of (C).

3. A composition as claimed in claim 2 comprising: from 65 to 95%, by weight, of (A), where (A) contains from 1 to 10%, by weight, of polydiorganosiloxane carbonamide units; from 5 to 35%, by weight, of (B); and from 10 to 30%, by weight of (C).

4. A composition as claimed in claim 1, wherein the polydiorganosiloxane carbonamide units are of formula I

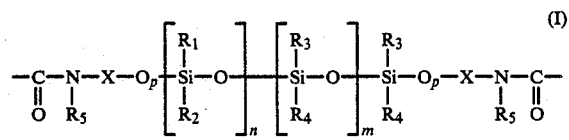

in which
R₁, R₂, R₃, and R₄, independently represent $C_1$-$C_{12}$ alkyl, alkenyl, aryl, aralkyl, halogenated alkyl, halogenated aryl or halogenated aralkyl;

X represents $C_1$-$C_{18}$ alkylene, arylene or aralkylene;
R₅ represents hydrogen, $C_1$-$C_6$ alkyl, or $C_5$-$C_8$-cycloalkyl and
n and m, which may be the same or different, are zero or an integer, with the proviso that the sum of the average degree of silicon polymerization (n+m) is greater than 4 and less than 1000, and is based on organo functional siloxanes having an average degree of silicon polymerization of from 4 to 1000; and
p is 0 or 1.

5. A composition as claimed in claim 4 wherein the sum of the average degree of silicon polymerization (n+m) is from 10 to 600.

6. A composition as claimed in claim 1, wherein the polyorganosiloxane carbonamide units are of the formula II,

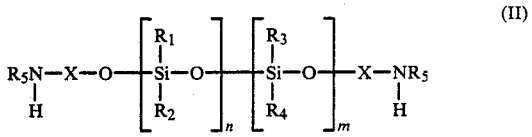

wherein
R₁, R₂, R₃ and R₄, independently represent $C_1$-$C_{12}$ alkyl, alke aryl, aralkyl, halogenated alkyl, halogenated aryl or halogenated aralkyl;
X represents $C_1$-$C_{18}$ alkylene, arylene or aralkylene;
R₅ represents hydrogen, $C_1$-$C_6$ alkyl or $C_5$-$C_8$ cycloalkyl; and
n and m, which may be the same or different, are zero or an integer, with the proviso that the degree of silicon polymerization (n+m) is greater than 4 and less than 1000 and is based on organo functional siloxanes having an average degree of silicon polymerization of from 4 to 1000.

7. A composition as claimed in claim 1 wherein the thermoplastic copolyamide containing polydiorganosiloxane carbonamide units comprises (i) polyether diamines containing (cyclo)aliphatic amino groups and (ii) other polyamide forming diamines.

8. A composition as claimed in claim 7, prepared by reacting 0.1 to 20%, by weight, of (i), where (i) contains at least two oxyalkylene groups and two (cyclo)aliphatic amino groups having a weight average molecular weight of from 148 to 3500, with 99.9 to 80%, by weight, of (ii), where the sum of (i) and (ii) equals 100%.

9. A composition as claimed in claim 7, prepared by reacting 0.5 to 5%, by weight, of (i) and 99.5 to 95% by weight of (ii).

10. A composition as claimed in claim 1, wherein (B) is obtained by grafting from 35 to 15%, by weight, of vinyl monomers onto from 65 to 85%, by weight, of a cross-linked, particulate elastomer having an average particle diameter ($d_{50}$) of from 0.25 to 0.8 μm, a gel content of at least 70%, by weight, and a glass transition temperature below −20° C.

11. A composition as claimed in claim 10, wherein the vinyl monomers are one or more $C_1$-$C_{18}$ ester of (meth)acrylic acid.

12. A composition as claimed in claim 10, wherein (B) is obtained by emulsion graft polymerizing a mixture of from 100 to 76%, by weight, methyl methacrylate and from 0 to 24%, by weight, other (meth)acrylates onto from 65 to 85%, by weight, of a diene rubber or acrylate rubber.

13. A composition as claimed in claim 1, wherein component (C) is present from 2 to 60 parts by weight.

14. A composition as claimed in claim 13, wherein the amorphous polyamide is derived from the reaction of hexamethylene diamine and isophthalic acid.

15. A composition as claimed in claim 1, comprising up to 60%, by weight, of one or more conventional additive selecting from lubricants, mold release agents, stabilizers, fillers, reinforcing materials, flame proofing agents or dyes.

16. A composition as claimed in claim 15, wherein the conventional additive is selected from fillers or reinforcing materials.

17. A composition as claimed in claim 4, wherein
$R_1$, $R_2$, $R_3$ and $R_4$, independently represent methyl, phenyl or vinyl;
X represents $C_2$-$C_6$ alkylene; and
$R_5$ represents $C_1$-$C_6$ alkyl or $C_5$-$C_8$ cycloalkyl.

18. A composition as claimed in claim 4, wherein
$R_1$, $R_2$, $R_3$ and $R_4$ represent methyl;
X represents isopropylene; and
$R_5$ represents cyclohexyl.

19. A composition as claimed in claim 6, wherein
$R_1$, $R_2$, $R_3$ and $R_4$, independently represent methyl, phenyl or vinyl,
X represents $C_2$-$C_6$ alkylene; and
$R_5$ represents $C_1$-$C_6$ alkyl or $C_5$-$C_8$ cycloalkyl.

20. A composition as claimed in claim 6, wherein
$R_1$, $R_2$, $R_3$ and $R_4$ represent methyl;
X represents isopropylene; and
$R_5$ represents cyclohexyl.

* * * * *